United States Patent
Joshi et al.

(10) Patent No.: US 10,911,486 B1
(45) Date of Patent: Feb. 2, 2021

(54) SYSTEMS AND METHODS FOR UTILIZING CUSTOM TAGGING TO PROTECT AGAINST PHISHING ATTACKS FROM MALICIOUS APPLICATIONS

(71) Applicant: Symantec Corporation, Mountain View, CA (US)

(72) Inventors: Anuradha Joshi, Bibwewadi (IN); Pallavi Rajput, Wakad (IN); Anand Darak, Dhayari (IN)

(73) Assignee: NORTONLIFELOCK INC., Tempe, AZ (US)

( * ) Notice: Subject to any disclaimer, the term of this patent is extended or adjusted under 35 U.S.C. 154(b) by 303 days.

(21) Appl. No.: 16/006,892

(22) Filed: Jun. 13, 2018

(51) Int. Cl.
*H04L 29/06* (2006.01)

(52) U.S. Cl.
CPC ...... *H04L 63/1483* (2013.01); *H04L 63/1416* (2013.01)

(58) Field of Classification Search
CPC ....... G06F 21/56–577; G06F 21/10–16; H04L 63/1483
See application file for complete search history.

(56) References Cited

U.S. PATENT DOCUMENTS

| | | | | |
|---|---|---|---|---|
| 7,721,332 B2* | 5/2010 | Stamper | ................. | G06F 9/453 726/22 |
| 2008/0059801 A1* | 3/2008 | Cohen | ..................... | G06F 21/57 713/176 |
| 2008/0059802 A1* | 3/2008 | Cohen | ................... | G06T 1/0028 713/176 |
| 2011/0219448 A1* | 9/2011 | Sreedharan | ........... | G06F 21/566 726/23 |
| 2012/0192275 A1* | 7/2012 | Oliver | ..................... | G06F 21/51 726/24 |
| 2012/0317645 A1* | 12/2012 | Fortier | .................. | G06F 21/562 726/24 |
| 2013/0283377 A1* | 10/2013 | Das | ..................... | H04L 63/1441 726/23 |
| 2018/0189489 A1* | 7/2018 | Zhang | .................... | G06N 20/00 |

* cited by examiner

*Primary Examiner* — Matthew T Henning
(74) *Attorney, Agent, or Firm* — FisherBroyles, LLP

(57) ABSTRACT

The disclosed computer-implemented method for utilizing custom tagging to protect against phishing attacks from malicious applications may include (1) associating a tag with a source application such that the tag is displayed in a user interface generated by the source application (2) launching a target application sharing at least one common feature with the source application, (3) determining, upon launching the target application, whether a user interface generated by the target application is an attack by a malicious application potentially causing harm to the computing device based on a presence or absence of the tag in the user interface, and (4) performing a security action with respect to the target application to protect the computing device from the attack when the tag is determined be absent from the user interface generated by the target application. Various other methods, systems, and computer-readable media are also disclosed.

20 Claims, 7 Drawing Sheets

SYSTEMS AND METHODS FOR UTILIZING CUSTOM TAGGING TO PROTECT AGAINST PHISHING ATTACKS FROM MALICIOUS APPLICATIONS

BACKGROUND

Phishing attacks by malicious applications are among the most significant threats for sensitive data stored on enterprise and consumer computing systems. These attacks are also some of the most difficult to detect due to the ease with which attackers can replicate commonly used system login user interfaces (e.g., by creating fake or mimicked user interfaces) that primarily target user sensitive information such as sign-in details for accessing email or other user applications.

Traditional solutions for addressing phishing attacks on endpoint or client devices may rely on phishing definition data provided from external servers for identifying potential threats and flagging any suspicious applications as malicious. However, traditional methods, due to outdated definitions data or a lack of server connectivity with monitored endpoint devices, may often fail to flag phishing applications as malicious, therefore increasing the susceptibility of endpoint devices to phishing attacks.

SUMMARY

As will be described in greater detail below, the instant disclosure describes various systems and methods for utilizing custom tagging to protect against phishing attacks from malicious applications.

In one example, a method for utilizing custom tagging to protect against phishing attacks from malicious applications may include (1) associating, by the computing device, a tag with a source application such that the tag is displayed in a user interface generated by the source application, the tag verifying that the source application is trusted, (2) launching, by the computing device, a target application sharing at least one common feature with the source application, (3) determining, by the computing device, upon launching the target application, whether a user interface generated by the target application is an attack by a malicious application potentially causing harm to the computing device, based on a presence or absence of the tag in the user interface, and (4) performing, by the computing device, a security action with respect to the target application to protect the computing device from the attack when the tag is determined be absent from the user interface generated by the target application.

In some examples, the method may further include identifying the target application as the source application when the tag is determined to be present in the user interface generated by the target application. In one example, a selectable control element may be associated with the source application. The selectable control element may include one or more attributes verifying that the source application is trusted. In some examples, the selectable control element may be a visual indicator inserted at a predetermined location in the user interface when the source application is launched on the computing device. In some examples, the attributes verifying that the source application is trusted may include authentication data.

In some examples, launching the target application may include (1) receiving, by the computing device, a selection of an application sharing a name and/or an icon associated with the source application and (2) launching the application in response to the selection.

In one example, the attack by the malicious application potentially causing harm to the computing device may be a phishing attack. In some examples, the security action may include removing the target application from the computing device. In one example, the user interface generated by the target application may mimic the user interface generated by the source application.

In one embodiment, a system for utilizing custom tagging to protect against phishing attacks from malicious applications may include several modules stored in memory, including (1) a tagging module that associates a tag with a source application stored on a computing device such that the tag is displayed in a user interface generated by the source application, the tag verifying that the source application is trusted, (2) a launching module that launches a target application on the computing device sharing at least one common feature with the source application, (3) a determining module that determines, upon launching the target application, whether a user interface generated by the target application is an attack by a malicious application potentially causing harm to the computing device based on a presence or absence of the tag in the user interface, (4) a security module that performs a security action with respect to the target application to protect the computing device from the attack when the tag is determined to be absent from the user interface generated by the target application, and (5) at least one physical processor that executes the tagging module, the launching module, the determining module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) associate a tag with a source application such that the tag is displayed in a user interface generated by the source application, the tag verifying that the source application is trusted, (2) launch a target application sharing at least one common feature with the source application, (3) determine upon launching the target application, whether a user interface generated by the target application is an attack by a malicious application potentially causing harm to the computing device based on a presence or absence of the tag in the user interface, and (4) perform a security action with respect to the target application to protect the computing device from the attack when the tag is determined to be absent from the user interface generated by the target application.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
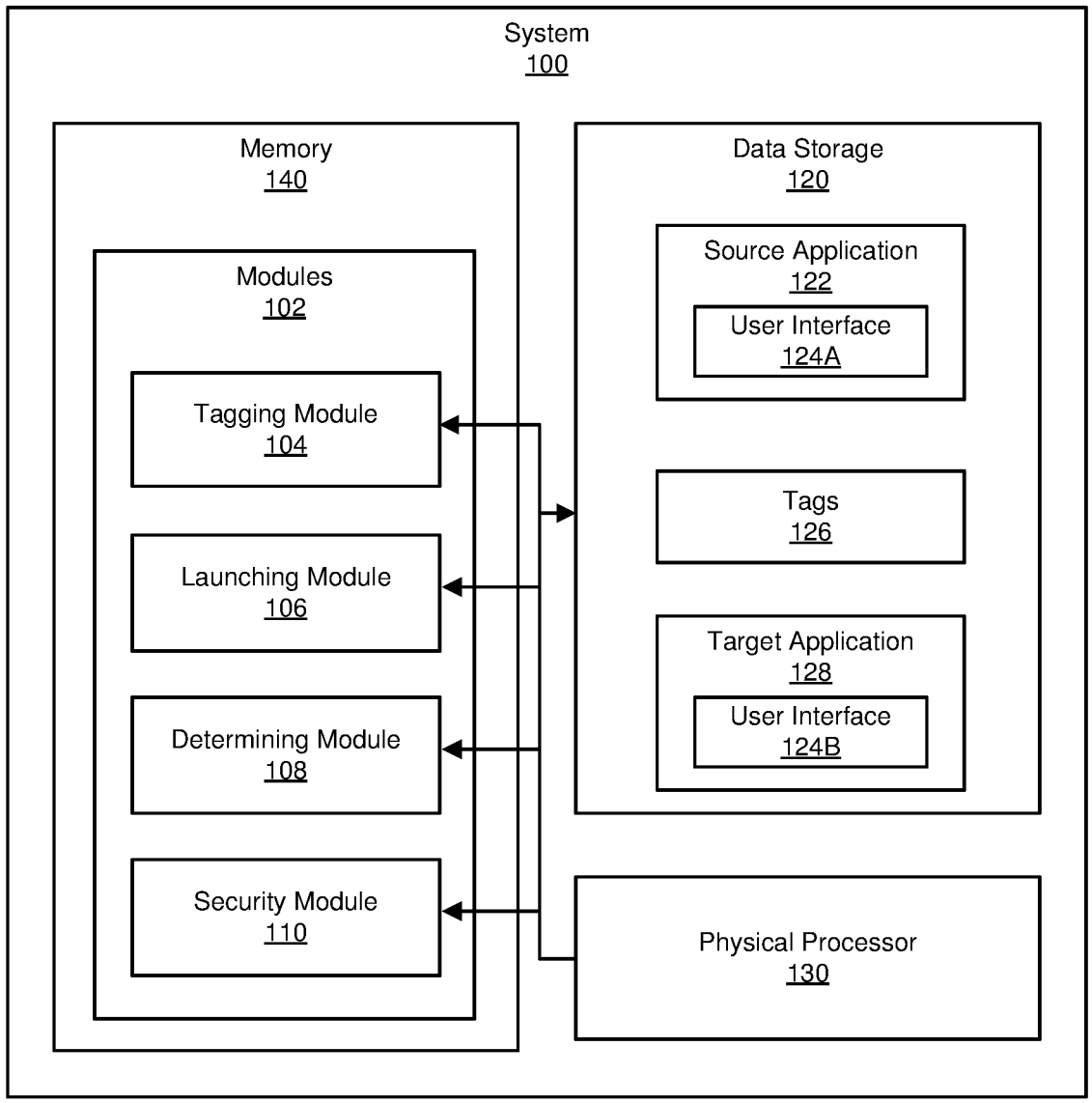
FIG. 1 is a block diagram of an example system for utilizing custom tagging to protect against phishing attacks from malicious applications.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for utilizing custom tagging to protect against phishing attacks from malicious applications. As will be explained in greater detail below, by associating a tag with the user interface (UI) of an application, the systems and methods described herein may enable a user to easily verify the authenticity of the application when the application is opened and the tag is displayed in the UI. Thus, the user may be protected from falling victim to phishing attacks utilizing faked or mimicked UIs generated by malicious applications posing as the application opened by the user.

In addition, the systems and methods described herein may improve the functioning of a computing device and/or the technical field of computer device security by preventing phishing attacks from malicious applications that may compromise the operation of the computing device. For example, the systems and methods described herein may prevent a user from inadvertently entering login credentials in a fake UI generated by a phishing application (posing as a trustworthy application) capable of distributing malware for damaging or disabling the user's computing device. In other examples, the systems described herein may allow a user to remove the phishing application from a computing device upon identifying a fake or mimicked UI, thereby preventing a potential malware attack.

Figure 2:
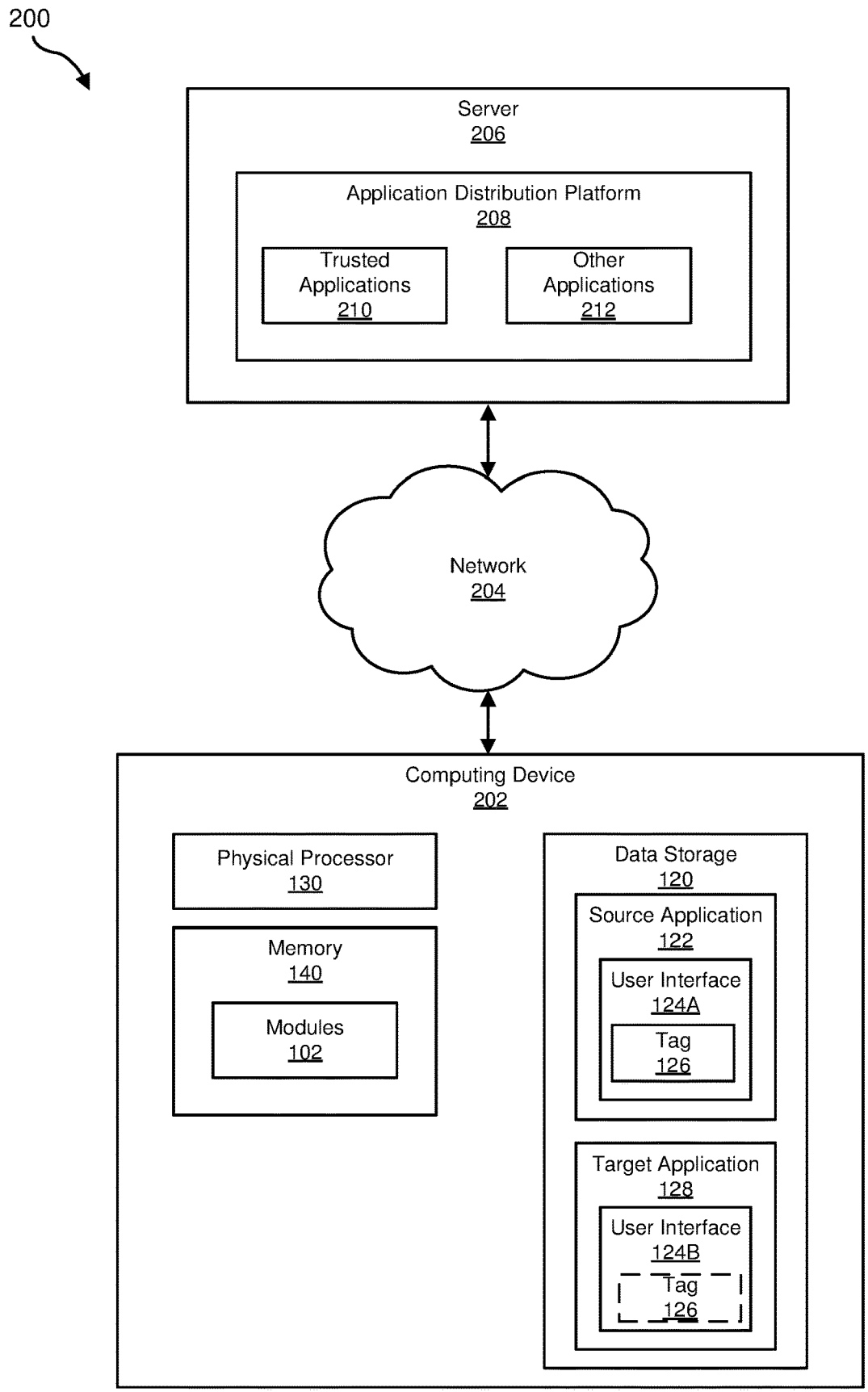
FIG. 2 is a block diagram of an additional example system for utilizing custom tagging to protect against phishing attacks from malicious applications.

The following will provide, with reference to FIGS. 1-2, detailed descriptions of example systems for utilizing custom tagging to protect against phishing attacks from malicious applications. Detailed descriptions of corresponding computer-implemented methods will also be provided in connection with FIG. 3. Detailed descriptions of example systems including a custom tag and a user interface to protect against phishing attacks from malicious applications will be provided in connection with FIGS. 4 and 5, respectively. In addition, detailed descriptions of an example computing system and network architecture capable of implementing one or more of the embodiments described herein will be provided in connection with FIGS. 6 and 7, respectively.

FIG. 1 is a block diagram of an example system 100 for utilizing custom tagging to protect against phishing attacks from malicious applications. As illustrated in this figure, example system 100 may include one or more modules 102 for performing one or more tasks. As will be explained in greater detail below, modules 102 may include a tagging module 104 that associates a tag 126 with a source application 122 such that tag 126 is displayed in a user interface 124A generated by source application 122, a launching module 106 that launches a target application 128 sharing at least one common feature with source application 122, a determining module 108 that determines, upon launching target application 128, whether a user interface 124B generated by target application 128 is an attack by a malicious application potentially causing harm to a computing device based on tag 126, and a security module 110 that performs a security action with respect to target application 128 to protect a computing device from a malicious the attack when tag 126 is determined be absent from user interface 124B generated by target application 128. Although illustrated as separate elements, one or more of modules 102 in FIG. 1 may represent portions of a single module or application.

The term "tag," as used herein, generally refers to computer program code for generating a unique or custom user interface element (e.g., a widget) configured to be associated with a source application and displayed in an application user interface when the source application is opened on a computing device. In some examples, a tag may include embedded authentication data for identifying the source application as trusted. For example, the authentication data may include user interface details for a trusted mobile device application from a statistics manager provided by the ANDROID operating system. In some examples, the tag may include a selectable user interface element which, when selected, may be configured to display the embedded authentication data to a user.

The term "source application," as used herein, generally refers to an application stored on a computing device that has been verified by an application source provider as trusted (e.g., not containing malicious code). In some examples, a source application may include an application provided by a digital distribution service platform (e.g., "App Store") operated by an online software provider.

The term "target application," as used herein, generally refers to an application stored on a computing device whose status is unknown prior to opening the application on a computing device. For example, a target application may include a previously installed application on a user's computing device to which a user did not assign a tag. In some examples, the target application may include malicious code for executing a phishing attack on a computing device (e.g., upon opening the target application, the tag is absent from the target application user interface). In other examples, a target application may not contain malicious code (e.g., upon opening the target application, the tag is present in the target application user interface) and thus, may be a trusted source application.

The term "malicious application," as used herein, generally refers to an application configured to cause harm to a computing device. In some examples, a malicious application may be configured to carry out phishing attacks by faking or mimicking a trusted application to obtain sensitive information for distributing malware on a computing device. For example, a phishing attack may mimic a trusted application user interface to deceive a user into entering their login information and execute malware on the user's computing device.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate utilizing custom tagging to protect against phishing attacks from malicious applications. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120. Data storage 120 generally represents any type or form of computing device capable of storing applications and/or application data. In one example, data storage 120 may store source application 122, tags 126, and target application 128.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202 and/or any other suitable computing system. As will be described in greater detail below, one or more of modules 102 from FIG. 1 may, when executed by at least one processor of computing device 202, enable computing device 202 to utilize custom tagging to protect against phishing attacks from malicious applications. For example, and as will be described in greater detail below, one or more of modules 102 may cause computing device 202 to (1) associate a tag with a source application such that the tag is displayed in a user interface generated by the source application, the tag verifying that the source application is trusted, (2) launch a target application sharing at least one common feature with the source application, (3) determine upon launching the target application, whether a user interface generated by the target application is an attack by a malicious application potentially causing harm to the computing device based on a presence or absence of the tag in the user interface, and (4) perform a security action with respect to the target application to protect the computing device from the attack when the tag is determined to be absent from the user interface generated by the target application.

Computing device 202 generally represents any type or form of computing device capable of reading computer-executable instructions. In one example, computing device 202 may be an endpoint device running client-side security software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of reading computer-executable instructions. In one example, server 206 may be an application server hosting an application distribution platform 208 for distributing trusted applications 210 and/or other applications 212 to computing device 202. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
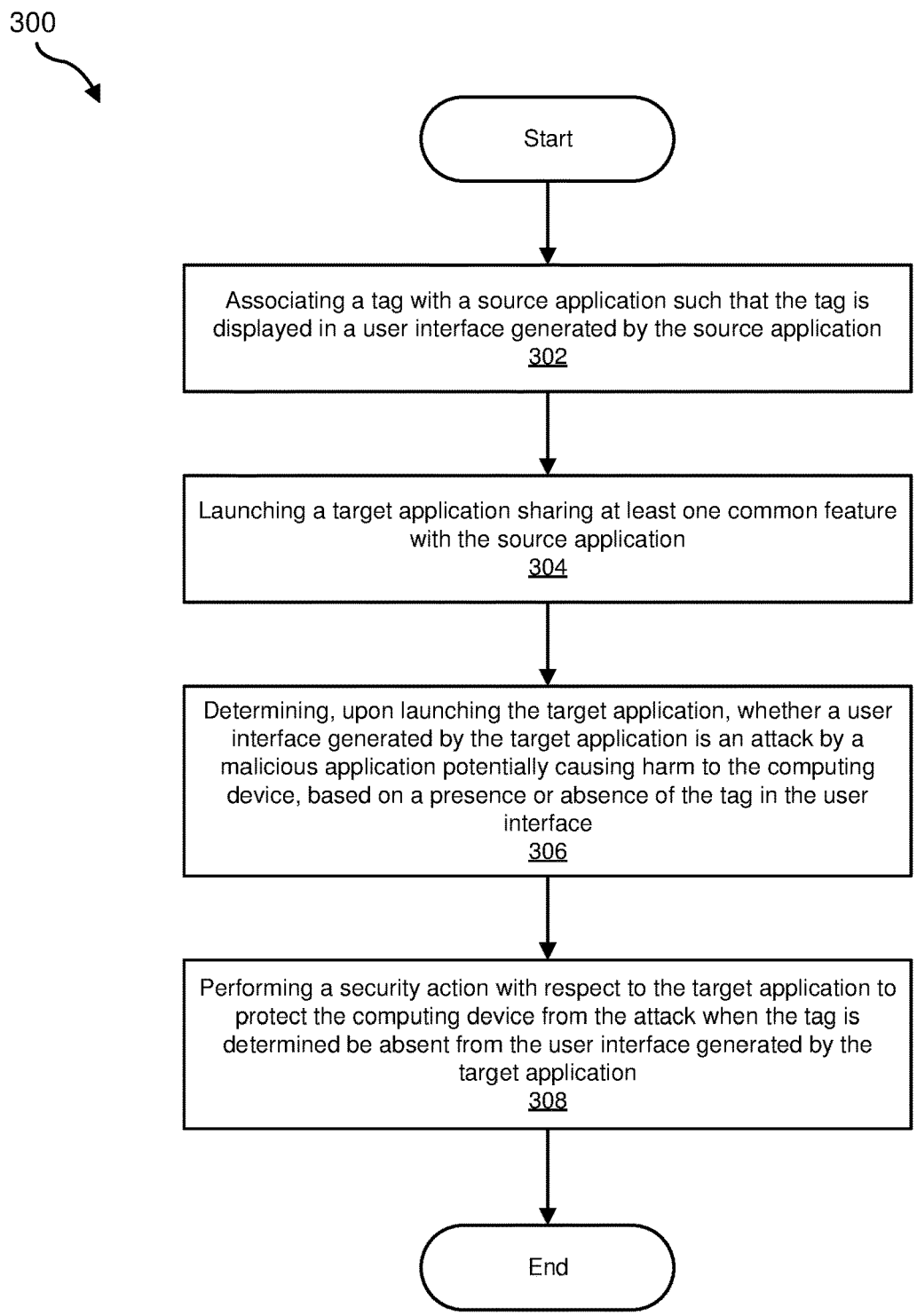
FIG. 3 is a flow diagram of an example method for utilizing custom tagging to protect against phishing attacks from malicious applications.

FIG. 3 is a flow diagram of an example computer-implemented method 300 for utilizing custom tagging to protect against phishing attacks from malicious applications. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may associate a tag with a source application such that the tag is displayed in a user interface generated by the source application. For example, tagging module 104 may, as part of computing device 202 in FIG. 2, associate tag 126 with source application 122 such that tag 126 is displayed in user interface 124A generated by source application 122. In some examples, tag 126 may verify that source application 122 is trusted.

Tagging module 104 may associate tag 126 with source application 122 in a variety of ways. In one example, tagging module 104 may associate a selectable control element including one or more attributes verifying that source application 122 is a trusted application. In one example, the selectable control element may be a visual indicator inserted at a predetermined location in user interface 124A when source application 122 is launched on computing device 202. For example, and without limitation, the selectable control element may be a flag displayed in the upper right-hand corner of user interface 124A when source application 122 is opened by a user on computing device 202. In some examples, the attributes verifying that source application 122 is a trusted application may include authentication data. In one example, the authentication data may include user interface details for a trusted mobile device application from a statistics manager provided by the ANDROID operating system. In some examples, the selectable control element may be a selectable user interface element which, when selected, may be configured to display embedded authentication data (e.g., user interface details from an operating system statistics manager) to a user.

At step 304, one or more of the systems described herein may launch a target application sharing at least one common feature with the source application. For example, launching module 106 may, as part of computing device 202 in FIG. 2, launch target application 128 sharing at least one common feature with source application 122.

Launching module 106 may launch target application 128 in a variety of ways. In one example, launching module 106 may receive a selection of an application (e.g., target application 128) sharing a name and/or an icon associated with source application 122 and then launch the application (e.g., target application 128) in response to the selection. For example, target application 128 may be named "App Store" on computing device 202 and have a corresponding icon that is identical to a name and corresponding icon associated with source application 122 (e.g., "App Store").

At step 306, one or more of the systems described herein may determine, upon launching the target application, whether a user interface generated by the target application is an attack by a malicious application potentially causing harm to the computing device, based on a presence or absence of the tag in the user interface. For example, determining module 108 may as part of computing device 202 in FIG. 2, determine whether user interface 124B generated by target application 128 is an attack based on the presence or absence of tag 126.

Determining module 108 may determine whether user interface 124B generated by target application 128 is an attack in a variety of ways. In one example, determining module 108 may determine whether user interface 124B is a phishing attack based on the presence of tag 126. For example, determining module 108 may be configured to detect whether a selectable control element is displayed in user interface 124B. If determining module 108 determines that the selectable control element is not displayed (i.e., absent) in user interface 124B (which in all other respect may mimic user interface 124A generated by source application 122), then user interface 124B may be identified as a phishing attack and target application 128 may be identified as a malicious application. Alternatively, if determining module 108 determines that the selectable control element is displayed (i.e., present) in user interface 124B, then user interface 124B may be identified as a trusted application (e.g., source application 122).

At step 308, one or more of the systems described herein may perform a security action with respect to the target application to protect the computing device from the attack when the tag is determined be absent from the user interface generated by the target application. For example, security module 110 may as part of computing device 202 in FIG. 2, perform a security action with respect to target application 128 to protect computing device 202 from the attack when tag 126 is determined to be absent from user interface 124B generated by target application 128.

Security module 110 may perform a security action with respect to target application 128 in a variety of ways. In one example, upon determining module 108 determining that target application 128 is a malicious application for carrying out a phishing attack, security module 110 may be configured to notify a user that user interface 124B generated by target application 128 is a phishing attack, close (or prompt the user to close) user interface 124B, and then delete target application 128 from computing device 202.

Figure 4:
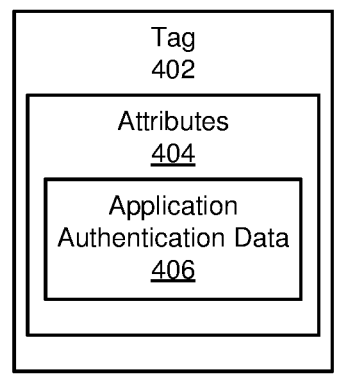
FIG. 4 is a block diagram of an example system including a utilizing custom tagging to protect against phishing attacks from malicious applications.

FIG. 4 is a block diagram of an example system 400 including a utilizing custom tagging to protect against phishing attacks from malicious applications. In some examples, tag 402 (which may be the same as tag 126 of FIG. 2) may include attributes 404 which may further include application authentication data 406. In some examples, tag 402 may include a control element which, when selected, may be configured to display application authentication data 406 to a user on computing device 202 of FIG. 2.

In some examples, application authentication data 406 may be embedded in tag 402 and may identify source application 122 and/or target application 128 (discussed above in FIG. 2) as trusted. In one example, application authentication data 406 may include may include user interface details for user interface 124A and/or user interface 124B generated by source application and target application 128, respectively. For example, the user interface details may include usage statistics from a statistics manager provided by the ANDROID operating system.

Figure 5:
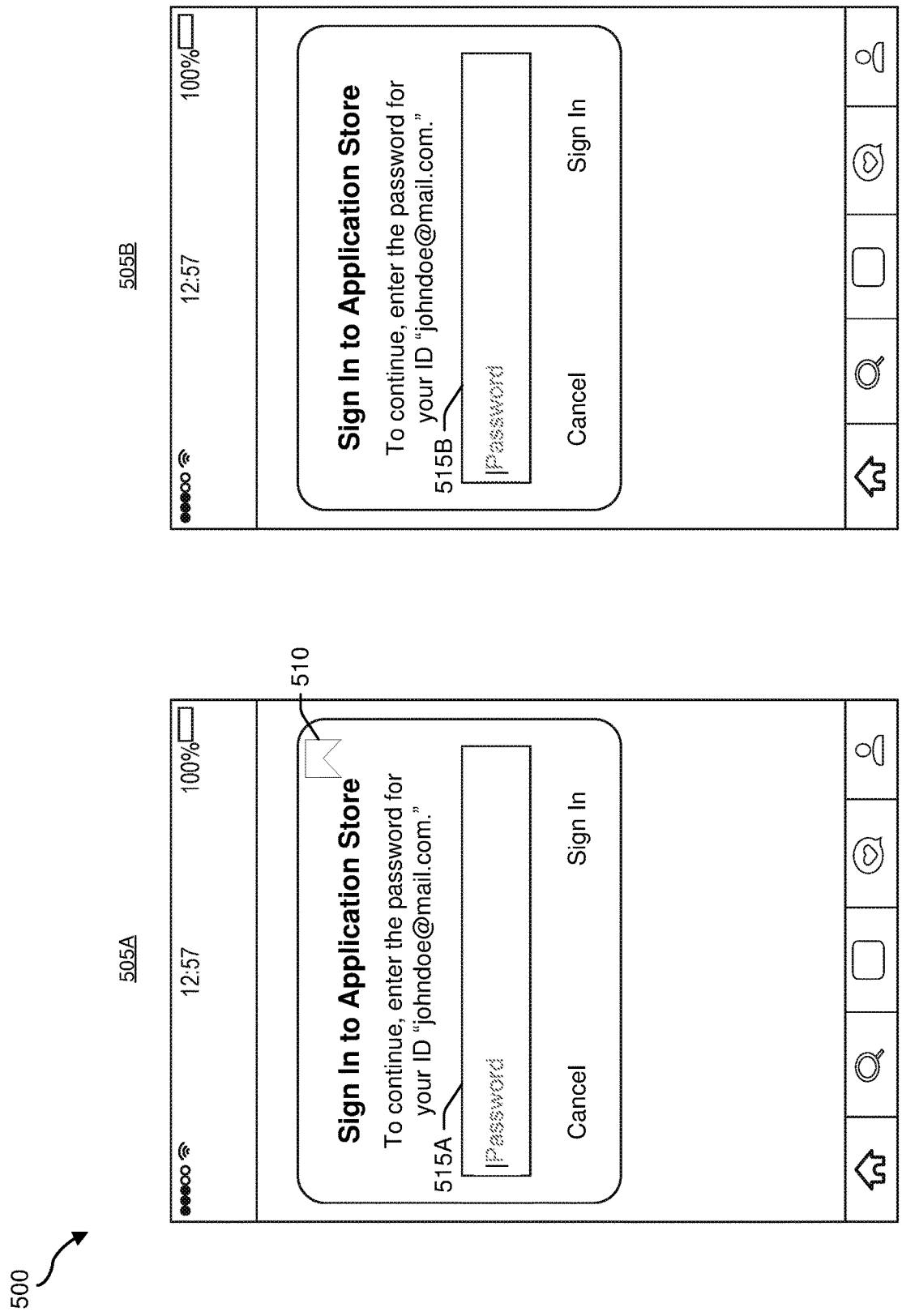
FIG. 5 is a block diagram of an example system including a user interface utilizing custom tagging to protect against phishing attacks from malicious applications.

FIG. 5 is a block diagram of an example system 500 including a user interface 505A utilizing custom tagging to protect against phishing attacks from malicious applications. Example system 500 further includes a user interface 505B without any tagging. In one example, user interface 505A may be generated by source application 122 on computing device 202 of FIG. 2 in response to a user request to open source application 122 and user interface 505B may be generated by target application 128 on computing device 202 of FIG. 2 in response to a user request to open target application 128.

In some examples, user interface 505A may display a user sign-in dialog to access an application service (e.g., an "App. Store") including a password entry box 515A. User interface 505A may also include a tag 510 (which may be the same as tag 126 of FIG. 2) incorporated into and displayed in the sign-in dialog. As discussed above with respect to FIG. 3, the presence of tag 510 may indicate to a user that the application generating user interface 505A (e.g., source application 122) is a trusted application.

In some examples, user interface 505B may display a user sign-in dialog to access an application service (e.g., an "App. Store") including a password entry box 515B. In this example, user interface 505B may not include the tag displayed in user interface 505A. As discussed above with respect to FIG. 3, the absence of tag 510 may indicate to a user that the application generating user interface 505B (e.g., target application 128) is a malicious application and that user interface 505B is a phishing attack intended to mimic user interface 505A.

In some examples, the absence of a tag in a user interface generated by an application may identify the application is trustworthy and the presence of a tag in the user interface may identify the application as carrying out a malicious phishing attack. For example, in some examples, the absence of tag 510 in user interface 505B may indicate to a user that an application is trustworthy and the presence of tag 510 in user interface 505A may indicate to a user that an application is malicious and that user interface 505A is a phishing attack. In yet another example, both user interface 505A and user interface 505B may include identical tags (not shown). In this example, a malicious application may copy a tagged user interface as part of a phishing attack, however only one of tags may be a selectable control element from which a user may view authentication data (e.g., user interface details) that may be used to verify an application generating the tagged user interface as trusted. Thus, in some examples, the systems described herein may still enable a user to identify a phishing attack even when a tag is copied by a malicious application in a user interface.

As described in connection with method 300 above, the systems and methods described herein may utilize custom application tagging to protect computing device endpoints from application phishing attacks. In some examples, the systems described herein may be incorporated into a mobile security application executing on a mobile computing device. The systems described herein may provide a user with a unique tag to associate with a selection of an application on the user's mobile computing device such that when the application is opened by the user, the tag may be seen associated with a graphical user interface (GUI) generated by the application as a viewable indicator or icon (e.g., a graphical control element, software widget, etc.). By associating the tag with the UI of the application, the systems and methods described herein may allow a user to verify the authenticity of the source of the UI thereby ensuring that the application is genuine and protecting the user from being the target of a phishing attack by a fake or mimicked application UI.

Figure 6:
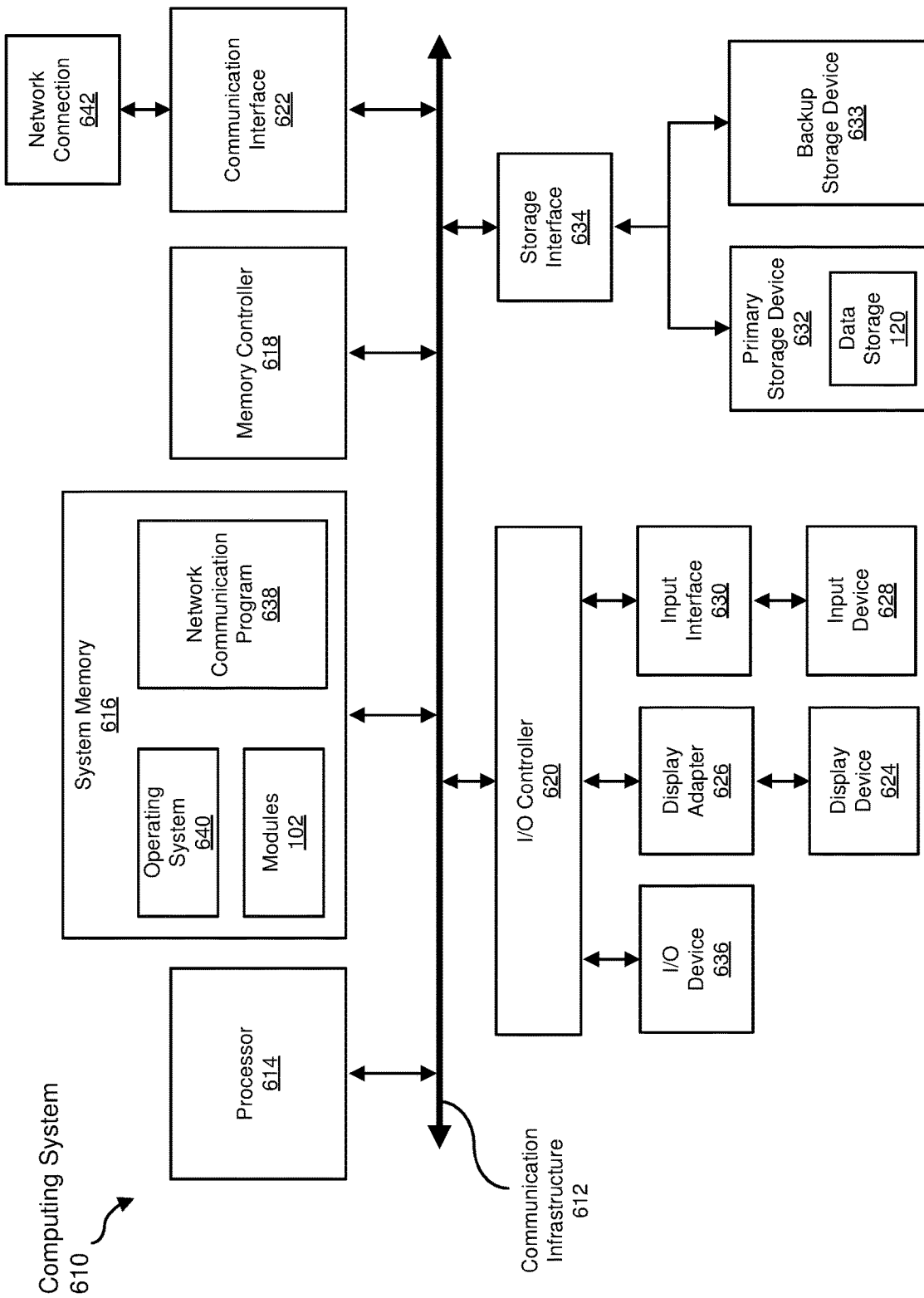
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
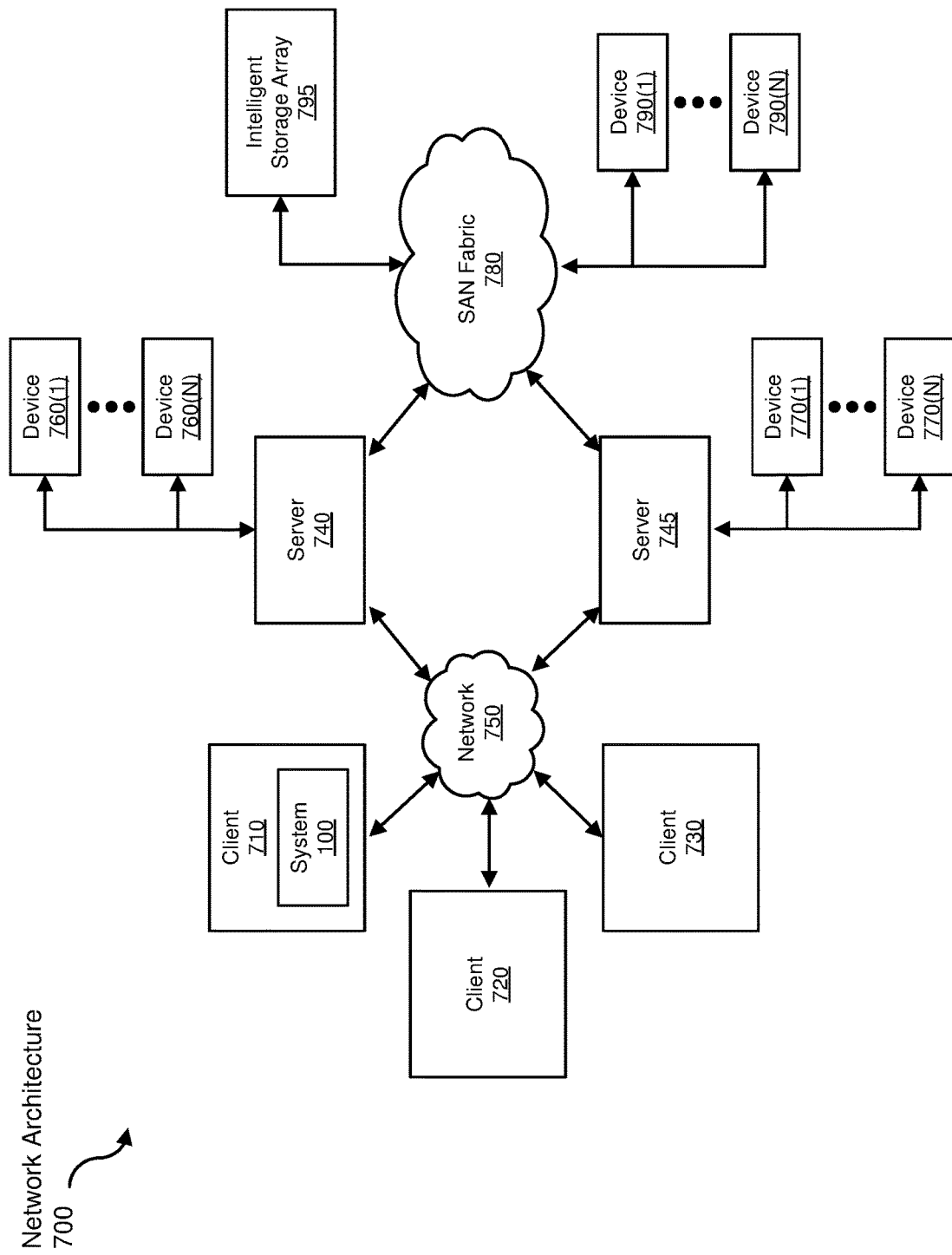
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for utilizing custom tagging to protect against phishing attacks from malicious applications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for utilizing custom tagging to protect against phishing attacks from malicious applications, at least a portion of the method being performed by a computing device comprising at least one processor, the method comprising:
   associating, by the computing device, a tag with a source application such that the tag is displayed in a user interface generated by the source application, wherein the tag comprises a selectable control element having embedded authentication data including usage statistics for the source application provided by an operating system statistics manager associated with the computing device, the embedded authentication data verifying that the source application is trusted;
   launching, by the computing device, a target application sharing at least one common feature with the source application;
   determining, by the computing device, upon launching the target application, whether a user interface generated by the target application is an attack by a malicious application potentially causing harm to the computing device, based on a presence or absence of the tag in the user interface; and
   performing, by the computing device, a security action with respect to the target application to protect the computing device from the attack when the tag is determined be absent from the user interface generated by the target application.

2. The computer-implemented method of claim 1, further comprising identifying the target application as the source application when the tag is determined to be present in the user interface generated by the target application.

3. The computer-implemented method of claim 1, wherein the selectable control element comprises a visual indicator inserted at a predetermined location in the user interface when the source application is launched on the computing device.

4. The computer-implemented method of claim 1, wherein launching, by the computing device, the target application sharing at least one common feature with the source application comprises:
   receiving, by the computing device, a selection of an application sharing at least one of a name and an icon associated with the source application; and
   launching the application sharing the at least one of a name and an icon with the source application in response to the selection.

5. The computer-implemented method of claim 1, wherein determining, by the computing device, upon launching the target application, whether the user interface generated by the target application is an attack by a malicious application potentially causing harm to the computing device, based on a presence or absence of the tag in the user interface, comprises determining whether the user interface generated by the target application is a phishing attack.

6. The computer-implemented method of claim 1, wherein performing, by the computing device, the security action with respect to the target application to protect the computing device from the attack when the tag is determined to be absent in the user interface generated by the target application, comprises removing the target application from the computing device.

7. The computer-implemented method of claim 1, wherein the user interface generated by the target application mimics the user interface generated by the source application.

8. The computer-implemented method of claim 1, wherein the embedded authentication data including the usage statistics for the source application is displayed to a user upon selecting the tag in the user interface.

9. The computer-implemented method of claim 1, wherein performing, by the computing device, the security action with respect to the target application to protect the computing device from the attack when the tag is determined to be absent in the user interface generated by the target application, comprises:
   notifying a user that the user interface generated by the target application is a phishing attack; and
   closing the user interface generated by the target application.

10. A system for utilizing custom tagging to protect against phishing attacks from malicious applications, the system comprising:
    a tagging module, stored in memory, that associates a tag with a source application stored on a computing device such that the tag is displayed in a user interface generated by the source application, wherein the tag comprises a selectable control element having embedded authentication data including usage statistics for the source application provided by an operating system statistics manager associated with the computing device, the embedded authentication data verifying that the source application is trusted;
    a launching module, stored in the memory, that launches a target application on the computing device sharing at least one common feature with the source application;
    a determining module, stored in the memory, that determines, upon launching the target application, whether a user interface generated by the target application is an attack by a malicious application potentially causing harm to the computing device, based on a presence or absence of the tag in the user interface;
    a security module, stored in the memory, that performs a security action with respect to the target application to protect the computing device from the attack when the tag is determined to be absent from the user interface generated by the target application; and
    at least one physical processor that executes the tagging module, the launching module, the determining module, and the security module.

11. The system of claim 10, wherein the determining module further identifies the target application as the source application when the tag is determined to be present in the user interface generated by the target application.

12. The system of claim 10, wherein the selectable control element comprises a visual indicator inserted at a predetermined location in the user interface when the source application is launched on the computing device.

13. The system of claim 10, wherein the launching module launches the target application on the computing device sharing at least one common feature with the source application by:

receiving a selection of an application sharing at least one of a name and an icon associated with the source application; and launching the application sharing the at least one of a name and an icon with the source application in response to the selection.

14. The system of claim 10, wherein the determining module determines, upon launching the target application, whether the user interface generated by the target application is an attack by a malicious application potentially causing harm to the computing device, based on a presence or absence of the tag in the user interface, by determining whether the user interface generated by the target application is a phishing attack.

15. The system of claim 10, wherein the security module performs the security action with respect to the target application to protect the computing device from the attack when the tag is determined to be absent from the user interface generated by the target application, by removing the target application from the computing device.

16. The system of claim 10, wherein the user interface generated by the target application mimics the user interface generated by the source application.

17. The system of claim 10, wherein the embedded authentication data including the usage statistics for the source application is displayed to a user upon selecting the tag in the user interface.

18. The system of claim 10, wherein the security module performs the security action with respect to the target application to protect the computing device from the attack when the tag is determined to be absent in the user interface generated by the target application, by:

notifying a user that the user interface generated by the target application is a phishing attack; and closing the user interface generated by the target application.

19. A non-transitory computer-readable medium comprising one or more computer-executable instructions that, when executed by at least one processor of a computing device, cause the computing device to:

associate, by the computing device, a tag with a source application such that the tag is displayed in a user interface generated by the source application, wherein the tag comprises a selectable control element having embedded authentication data including usage statistics for the source application provided by an operating system statistics manager associated with the computing device, the embedded authentication data verifying that the source application is trusted;

launch, by the computing device, a target application sharing at least one common feature with the source application;

determine, by the computing device, upon launching the target application, whether a user interface generated by the target application is an attack by a malicious application potentially causing harm to the computing device, based on a presence or absence of the tag in the user interface; and perform, by the computing device, a security action with respect to the target application to protect the computing device from the attack when the tag is determined to be absent from the user interface generated by the target application.

20. The non-transitory computer-readable medium of claim 19, wherein the computer-executable instructions further cause the computing device to identify the target application as the source application when the tag is determined to be present in the user interface generated by the target application.

\* \* \* \* \*